2,844,631

2,844,631
DI(META-XYLYLENE) TRIAMINE

John B. Wilkes, Albany, Calif., assignor to California Research Corporation, San Francisco, Calif., a corporation of Delaware No Drawing. Application March 30, 1956
Serial No. 574,961

1 Claim. (Cl. 260—570.9)

The present invention relates to the preparation of the new compound di(meta-xylylene) triamine having the formula $NH_2CH_2$—$C_6H_4$—$CH_2NHCH_2C_6H_4$—$CH_2NH_2$, which is useful in the preparation of thermosetting polyamides and as cross-linking agent in epon resins (prepared from epichlorohydrin and bis-phenol).

Broadly, the novel compound of the invention is prepared by the hydrogenation of isophthalonitrile. In turn, isophthalonitrile can be prepared by following the teachings of U. S. Patent No. 2,678,941, that is, by the conversion of isophthalic acid to isophthalonitrile by contacting the said acid with ammonia at elevated temperatures below about 590° F.

More specifically, the compound of the invention is obtained by the hydrogenation of isophthalonitrile at elevated temperatures above about 250° F. and higher, for example, 500° F., in the presence of a hydrogenation catalyst, e. g., Raney nickel, and an inert solvent, e. g., toluene, isopropyl alcohol or commercial xylene, which is a mixture of the various xylene isomers and ethylbenzene. Pressure during reaction may range from about 1000 p. s. i. g. to about 10,000 p. s. i. g.

The following examples will further illustrate the practice of the invention.

Example 1

About 75 g. of isophthalonitrile, 215 g. of xylene solvent and 1.7 g. of Raney nickel were placed in an autoclave of 630 cc. capacity. The reaction wax conducted at 300° F. and a pressure of 3000 p. s. i. g. At the end of two hours, when consumption of hydrogen had ceased, the reaction was deemed complete. The autoclave was allowed to cool, and the contents then subjected to distillation. A fraction boiling at about 455° F. at 4–5 mm. pressure was cooled to a temperature of about 32° F. to effect crystallization of the product. The resulting product was recrystallized with a mixture of 25% benzene and 75% by volume of mixed hexanes. The recrystallized colorless crystalline product was determined to have a melting point between 115–124° F.

The hydrochloride derivative of the product was prepared by reacting it with stoichiometric amounts of hydrochloric acid followed by crystallization from isopropyl alcohol. Analysis of the triamine $C_{16}H_{24}N_3Cl_3$ having a melting point of 513° F. was as follows:

|  | Calculated | Found |
| --- | --- | --- |
| Carbon, percent | 52.68 | 52.09, 52.10 |
| Hydrogen, percent | 6.83 | 6.60, 6.48 |
| Nitrogen, percent | 11.52 | 11.08, 11.14 |

Example 2

Following substantially the procedure of Example 1, the autoclave was charged with 100 g. isophthalonitrile, 200 g. xylene and 20 cc. of ⅛ inch pellets of reduced cobalt oxide hydrogenation catalyst. The temperature of reaction was 300° F., the pressure 3000 p. s. i. g. and the time 140 minutes. There was recovered 24.4 g. of di(meta-xylylene) triamine.

As already indicated one use of the novel compound of the invention is in conjunction with the preparation of a thermoset polymer for molding applications. Such a polymer is prepared, for example, by heating one mole of adipic with one mole of di(meta-xylylene) triamine to a temperature of 370 to 500° F. Heating is continued until water is no longer produced. The resulting polymer in the molten state is then cured with one mole of paraformaldehyde to give the finished product.

Obviously many modifications and variations of the invention, as hereinbefore set forth, may be made without departing from the spirit and scope thereof and, therefore, only such limitations should be imposed as are indicated in the appended claims.

I claim:
The compound di(meta-xylylene) triamine.

References Cited in the file of this patent
UNITED STATES PATENTS

| 2,149,273 | Carothers | Mar. 7, 1939 |
| 2,411,141 | Adams | Nov. 19, 1946 |
| 2,411,142 | Kelso et al. | Nov. 19, 1946 |
| 2,640,080 | De Tar | Mar. 26, 1953 |